United States Patent Office 3,213,134
Patented Oct. 19, 1965

3,213,134
DECYCLIZATION OF FLUORINATED CYCLIC ETHERS
Duane E. Morin, Decatur, Ala., assignor to Minnesota Mining and Manufacturing Company, St. Paul, Minn., a corporation of Delaware
No Drawing. Filed Oct. 30, 1962, Ser. No. 234,223
9 Claims. (Cl. 260—544)

This invention relates to a process for the treatment of fluorinated cyclic ethers. In one aspect this invention relates to the decyclization of perfluorinated cyclic monoether having at least 3 carbon atoms.

Perfluorinated cyclic monoethers are known in the art. The perfluorinated cyclic monoethers are prepared as products and by-products from the electrochemical cell as disclosed in U.S. Patent Uo. 2,519,983—Simons, issued August 22, 1950. Specific perfluorinated cyclic monoethers and the method of preparation thereof by the electrochemical cell are disclosed in U.S. Patent No. 2,594,272—Kauck et al., issued April 29, 1952, and in U.S. Patent No. 2,644,823—Kauck et al., issued July 7, 1953.

These perfluorinated cyclic monoethers are useful as refrigerants, solvents, dielectric or insulating fluids, etc. They are noted for their chemical and physical stability and for their solvent action. These compounds are difficult to use as reactants or to convert to other chemical compounds, and few, if any, reactions with these compounds are known in the art. Since the perfluorocyclic monoethers are available in the art as a direct product and as a by-product, it is much to be desired to provide a method for the conversion of these cyclic monoethers to other chemical compounds which are useful.

It is an object of this invention to provide a process for the conversion of perfluorocyclic monoethers to other compounds.

It is another object of this invention to provide a new method for making derivatives of perfluorocyclic ethers.

Various other objects and advantages of the present invention will become apparent to those skilled in the art from the accompanying description and disclosure.

According to this invention, a perfluorocyclic monoether having at least 3 carbon atoms is decyclized in the presence of antimony pentafluoride as a catalyst under conditions such that the cyclic ether chain is opened to produce non-cyclic oxygenated derivatives, such as alcohols, ketones and acid fluorides. It has been found that perfluorocyclic monoethers can be decyclized in the presence of the above catalyst under temperature conditions from about —15° C. to about 350° C. at autogenous pressure to produce the corresponding open-chain derivatives. The product of the decyclization reaction depends upon the carbon substitution of the cyclic ethers.

Those perfluorocyclic monoethers having at least 3 carbon atoms which are preferred are represented by the following typical formula:

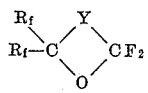

in which Y is a direct bond between carbon atoms or is a perfluorinated alkylene radical of not more than 3 carbon atoms, $R_f$ is fluorine or a perfluoroalkyl radical of not more than 8 carbon atoms per molecule, and at least one $R_f$ is a perfluoroalkyl radical except where Y has 2 carbon atoms, such as a perfluoromethyl radical. Examples of perfluorocyclic monoethers useful for the starting material of the present process and within the scope of the above typical formula are: perfluoropropene-oxide-1,2; perfluoroisobutene-oxide-1,2; perfluorobutene-oxide-1,2; perfluorobutene-oxide-1,4; perfluoro-4-ethyl-butene-oxide-1,4; perfluoroheptance-oxide-1,2; perfluorooctene-oxide-1,4; perfluoro-4-methylbutene-oxide-1,4; and perfluoro-2-methylpentene-oxide-1,2.

When one $R_f$ of the above formula is fluorine and the other is an alkyl radical for the starting compound of the present invention, the product is the corresponding ketone;

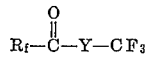

When both $R_f$'s are alkyl radicals or fluorine, the product is the acid fluoride;

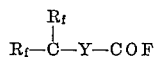

In some instances when hydrogen fluoride is added to the reaction mixture, both the above types of starting compounds will produce alcohols as products. However, in the absence of the addition of hydrogen fluoride to the reaction mixture, only ketones and acid fluorides are produced.

The quantity of catalyst may vary over a considerable range. Usually the weight ratio of perfluorocyclic monoether to catalyst is between about 1:10 and about 25:1.

As previously mentioned, the perfluorocyclic monoether starting compounds can be prepared from the electrochemical cell. These ethers can also be prepared by oxidation of perfluoroolefins with hydrogen peroxide in an aqueous alkali solution, such as in the presence of an aqueous alkali carbonate solution, e.g. sodium carbonate, at a temperature between about 0° C. and about 50° C. These cyclic ethers containing rings of more than three members to the ring are preferably prepared in the electrochemical cell while the ethers of three-membered rings are prepared from oxidation of the perfluoroolefin as above.

The acid fluorides produced by this invention can be hydrolyzed to the free acid which is in turn converted to the alkali metal ammonium salts, which latter products are useful as surfactants. The ketones produced herein are useful as solvents for fluorinated polymers and can be condensed with esters of perfluorocarboxylic acids to form perfluorinated diketones which are useful chelating agents.

The following examples are offered as a better understanding of the present invention and relate to the conversion of the perfluorocyclic monoethers and their useful derivatives, and the examples are not to be construed as unnecessarily limiting to the invention.

Example I

To 10 ml. of acetone and 31 g. of 30% hydrogen peroxide at 0° C. to 5° C. in a two-neck, one-liter glass flask with a magnetic stirrer and Dry Ice condenser was added 27 g. (0.135 m.) of perfluoroisobutene. 75 ml. of water containing 15 g. $Na_2CO_3$ and 16 g. $Na_2HPO_4$ was added drop-wise during two hours. Stirring was continued for an additional 20 minutes. The product was distilled out through the Dry Ice condenser into a vacuum system. There was obtained 13.3 g. of product, a 46% yield. Infrared spectroscopy indicated about 95% perfluoroisobutene oxide and no olefin.

Example II

To a glass flask with stirrer and condenser was charged 59.6 g. (0.17 m.) of perfluoroheptene-1 and 51 g. (0.5 m.) of 35% $H_2O_2$. 18.9 g. (0.17 m.) of sodium carbonate dissolved in 170 g. of water was slowly added. The mixture became warm indicating reaction. No cooling was applied. After addition of the sodium carbonate, the fluorocarbon phase was separated and dried over phosphorus pentoxide; 42.9 g. was recovered. This material was reacted with bromine to remove unreacted olefin and the mixture was then distilled. The product, perfluoroheptene oxide-1,2, boiling at 80° C. to 88° C., was recovered.

Example III

Perfluoropropene, 18 g. (0.12 m.), 23 g. of $Na_2CO_3$, 35 g. of water, 15 g. of $Na_2HPO_4$ and 35 g. of 30% $H_2O_2$ (0.31 m.) were charged to a 300-ml. stainless autoclave and agitated in an Aminco rocking mechanism for five and one-half hours. Distillation from the autoclave into a cooled trap gave 3.5 g. of product which infrared spectroscopy indicated to be 70% perfluoropropene oxide-1,2. Purification could be accomplished by bromination and distillation or by resubjecting the product to hydrogen peroxide and sodium carbonate.

Example IV 20 g. of perfluorobutene-1, 19 g. of $Na_2CO_3$, 50 ml. of water and 18 g. of 30% $H_2O_2$ were agitated in a 300-ml. stainless steel pressure vessel 20 hours at 25° C. There was obtained 13 g. of product. Infrared spectroscopy indicated epoxide absorption at 6.48μ. Gas liquid chromatography indicated approximately 20% of the desired product, perfluorobutene-oxide-1,2. Purification was accomplished by bromination of the unreacted olefin followed by distillation.

Example V

Into a heavy-walled glass ampoule containing 3 g. of $SbF_5$ was condensed 0.5 g. (400 ml. at 140 mm. Hg pressure) of the perfluoropropene-oxide-1,2 of Example III. The ampoule was sealed in vacuum and heated at 90° C. for 20 hours. The ampoule was cooled to −180° C. and opened into a vacuum system, then warmed to room temperature. At 400 ml., 132 mm. Hg pressure was present. Infrared spectroscopy indicated perfluoroacetone and a small amount of $COF_2$ and $SiF_4$.

Example VI

The reaction of 15 g. of perfluoroheptene-oxide-1,2 of Example II and 1.2 g. of $SbF_5$ at 150° C. for 18 hours gave 14.1 g. of liquid which was recovered by pumping through a sulfur packed tube for the removal of $SbF_5$. Upon distillation, 9.9 g. of 2-perfluoroheptanone, boiling at 80° C. to 81° C. was obtained.

Example VII 46 g. of perfluorobutene-oxide-1,4 (c-$C_4F_8O$) was condensed into a liquid air-cooled trap. 45 g. of $SbF_5$ was added to the aluminum liner and a stopper fitted with inlet and outlet tubes was inserted. The liner was then cooled in liquid air. The trap containing c-$C_4F_8O$ was attached and then warmed up to allow the ether to condense down into the liner. The liner was placed in the vessel and sealed as rapidly as possible. The reaction was carried out at 120° C. for five hours. The use of an aluminum liner prevented the decomposition of $SbF_5$, even at elevated temperatures.

Product recovery consisted of cooling the lower part of the reaction vessel in liquid air to condense down all materials present. The cap was then removed. The vessel was connected by tubing to a liquid air-cooled trap. The reaction vessel was allowed to warm up. Low boiling materials were collected in the trap. 40 g. of low boilers was obtained. c-$C_4F_8O$ and its products boiled at about 0° C. $SbF_5$ was not detected in the collected low boilers. The yield of perfluorobutyric acid fluoride was 75%.

Example VIII 21.5 g. (0.07 mol) of perfluoro-1-ethylbutene-oxide-1,4 (c-$C_6F_{12}O$) and 17.6 g. (0.08 mol) of $SbF_5$ were reacted at 200° C. for five hours in the aluminum-lined autoclave. The vessel was cooled in liquid air before being unsealed. About 0.1 g. of low boiling material was obtained, consisting mostly of $CO_2$ with small amounts of $CF_4$ and unknowns. 13.1 g. of material essentially perfluoroethylpropyl ketone remained after low boiler removal. $SbF_5$ was removed by vaporizing the material through a tube packed with sulfur.

Example IX

To 1.5 g. of $SbF_5$ in a glass ampoule is added 2 g. of perfluoroisobutene-oxide (1.015 l. at 290 mm.). The ampoule is sealed in vacuum and then agitated 16 hours at 80° C. No liquid is present at room temperature. The ampoule is opened into a vacuum system after cooling. Analysis by infrared spectroscopy shows the presence of perfluoroisobutyric acid fluoride.

Various alterations and modifications of reaction conditions may become apparent to those skilled in the art without departing from the scope of this invention.

Having described my invention, I claim:

1. A process which comprises decyclizing a perfluorocyclic monoether having the formula

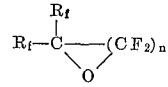

in which $n$ is 1 to 4, $R_f$ is selected from the group consisting of fluorine and a perfluoroalkyl radical of not more than eight carbon atoms and in which at least one $R_f$ is such a perfluoroalkyl radical except where $n$ is 3, in the presence of antimony pentafluoride as a catalyst at a temperature between about −15° and about 350° C. to produce an open chain derivative of said perfluorocyclic monoether; the open chain derivative being a ketone when one $R_f$ is fluorine and the other is a perfluoroalkyl radical, otherwise the derivative is an acid fluoride, and the weight ratio of monoether to catalyst being between about 1:10 and about 25:1.

2. The process of claim 1 in which one $R_f$ of the monoether is fluorine and the other $R_f$ is a perfluoroalkyl radical.

3. The process of claim 1 in which both $R_f$'s of the monether are perfluoroalkyl radicals.

4. The process of claim 1 in which both $R_f$'s of said monoether are fluorine.

5. The process of claim 1 in which the monoether is perfluoropropene-oxide-1,2.

6. The process of claim 1 in which the monoether is perfluoroheptene-oxide-1,2.

7. The process of claim 1 in which the monoether is perfluorobutene-oxide-1,4.

8. The process of claim 1 in which the monoether is perfluoro-1-ethylbutene-oxide-1,4.

9. The process of claim 1 in which the monoether is perfluoroisobutene-oxide.

References Cited by the Examiner
UNITED STATES PATENTS 2,456,768  12/48  Chaney _____ 260—544
2,549,892   4/51  Chaney _____ 260—544

OTHER REFERENCES

Shiukin et al.: "Chem. Abstracts," Vol. 51 pp. 9568–9569 (1957).

LORRAINE A. WEINBERGER, Primary Examiner,
LEON ZITVER, Examiner.